(12) United States Patent
Groll et al.

(10) Patent No.: US 11,364,706 B2
(45) Date of Patent: Jun. 21, 2022

(54) COOKWARE HAVING A GRAPHITE CORE

(71) Applicant: All-Clad Metalcrafters, L.L.C., Canonsburg, PA (US)

(72) Inventors: William A. Groll, McMurray, PA (US); John Watkins, Canonsburg, PA (US)

(73) Assignee: All-Clad Metalcrafters, L.L.C., Canonsburg, PA (US)

( * ) Notice: Subject to any disclaimer, the term of this patent is extended or adjusted under 35 U.S.C. 154(b) by 682 days.

(21) Appl. No.: 16/226,167

(22) Filed: Dec. 19, 2018

(65) Prior Publication Data
US 2020/0198296 A1 Jun. 25, 2020

(51) Int. Cl.
*B32B 9/04* (2006.01)
*A47J 27/00* (2006.01)
*A47J 36/04* (2006.01)

(52) U.S. Cl.
CPC ............. *B32B 9/041* (2013.01); *A47J 27/002* (2013.01); *A47J 36/04* (2013.01)

(58) Field of Classification Search
CPC .......... B32B 9/041; A47J 27/002; A47J 36/04
USPC ...................................................... 220/573.1
See application file for complete search history.

(56) References Cited

U.S. PATENT DOCUMENTS

| | | | |
|---|---|---|---|
| 2,057,254 A | 10/1936 | Sommer | |
| 2,284,504 A | 5/1942 | Wrighton et al. | |
| 2,576,377 A | 11/1951 | Wachos, Jr. et al. | |
| 2,765,728 A | 10/1956 | Pearce | |
| 2,908,073 A | 10/1959 | Dulin | |
| 3,054,395 A | 9/1962 | Torino | |
| 3,496,625 A | 2/1970 | Winter | |
| 4,029,253 A | 6/1977 | Cartossi | |
| 4,167,606 A | 9/1979 | Ulam | |
| 4,204,628 A | 5/1980 | Houston et al. | |
| 4,246,045 A | 1/1981 | Ulam | |
| 4,252,263 A | 2/1981 | Houston | |
| 4,274,901 A | 6/1981 | Elber | |
| 4,315,591 A | 2/1982 | Houston | |
| 4,385,310 A | 5/1983 | Houston | |

(Continued)

FOREIGN PATENT DOCUMENTS

CA 3053508 A1 8/2018
CN 2892466 Y 4/2007

(Continued)

*Primary Examiner* — J. Gregory Pickett
*Assistant Examiner* — Niki M Eloshway
(74) *Attorney, Agent, or Firm* — The Webb Law Firm

(57) ABSTRACT

Provided is cookware made from a bonded multi-layer composite having at least one upper metal layer, a lower metal layer having a plurality of upwardly protruding, spaced-apart dimples formed thereon, and a graphite core layer disposed between the at least one upper metal layer and the lower metal layer. The graphite core layer has a plurality of spaced-apart holes extending through the graphite layer. The plurality of dimples extend through the plurality of holes, and the plurality of dimples are metallurgically bonded to the at least one upper metal layer and an outer portion of the lower metal layer is metallurgically bonded to the at least one upper metal layer. The at least one upper metal layer has a layer of stainless steel or titanium bonded to a sub-layer of aluminum. A method of making the bonded multi-layer composite cookware is also disclosed.

22 Claims, 5 Drawing Sheets

(56) References Cited

U.S. PATENT DOCUMENTS

| | | |
|---|---|---|
| 4,444,352 A | 4/1984 | Glascock |
| 4,541,411 A | 9/1985 | Woolf |
| 4,752,518 A | 6/1988 | Lohrke |
| 4,790,292 A | 12/1988 | Kuhn |
| 4,793,324 A | 12/1988 | Caferro |
| 4,940,635 A | 7/1990 | Andrieu et al. |
| 5,064,055 A | 11/1991 | Bessenbach et al. |
| 5,193,737 A | 3/1993 | Carraher |
| 5,345,667 A * | 9/1994 | Coppier ............... A47J 27/002 29/505 |
| 5,439,165 A | 8/1995 | Cartossi |
| 5,694,674 A * | 12/1997 | Flammang ............ B23K 20/002 29/460 |
| 5,848,746 A | 12/1998 | Wagner et al. |
| 6,082,611 A | 7/2000 | Kim |
| 6,258,457 B1 | 7/2001 | Ottinger et al. |
| 6,267,830 B1 | 7/2001 | Groll |
| 6,715,631 B2 | 4/2004 | Kim |
| 6,892,781 B2 | 5/2005 | Micherron et al. |
| 7,150,279 B2 * | 12/2006 | Cheng .................. A47J 27/002 126/390.1 |
| 7,159,757 B2 | 1/2007 | Takahashi et al. |
| 7,168,148 B2 | 1/2007 | Groll |
| 7,581,669 B2 | 9/2009 | Lee |
| 7,900,811 B1 | 3/2011 | Alman et al. |
| 8,037,602 B2 | 10/2011 | Huang |
| 8,133,596 B2 | 3/2012 | Groll |
| 8,806,737 B2 | 8/2014 | Huang |
| 9,078,539 B2 * | 7/2015 | Groll ................ B23K 20/023 |
| 2002/0076565 A1 | 6/2002 | Fairbourn |
| 2003/0160053 A1 * | 8/2003 | Kim ..................... A47J 36/02 220/573.1 |
| 2004/0232211 A1 | 11/2004 | Kayser et al. |
| 2005/0040171 A1 * | 2/2005 | Alim .................... A47J 27/022 220/573.1 |
| 2006/0068205 A1 | 3/2006 | Potier |
| 2006/0096467 A1 * | 5/2006 | Dominguez ............ A47J 36/02 99/451 |
| 2006/0107842 A1 | 5/2006 | Groll |
| 2006/0117539 A1 | 6/2006 | Alim |
| 2006/0289487 A1 | 12/2006 | Tarenga |
| 2008/0017074 A1 * | 1/2008 | Park ..................... A47J 36/04 106/404 |
| 2008/0083747 A1 | 4/2008 | Park |
| 2009/0188909 A1 | 7/2009 | Jones et al. |
| 2009/0258248 A1 | 10/2009 | Tsushima |
| 2010/0055491 A1 | 3/2010 | Vecchio et al. |
| 2011/0041708 A1 | 2/2011 | Groll |
| 2012/0068414 A1 | 3/2012 | Potier |
| 2012/0234524 A1 | 9/2012 | Fan |
| 2013/0017410 A1 * | 1/2013 | Groll ..................... C23C 28/345 428/654 |
| 2013/0108761 A1 | 5/2013 | Kenton |
| 2015/0001226 A1 * | 1/2015 | Groll ..................... A47J 37/10 220/573.1 |
| 2015/0313405 A1 * | 11/2015 | Groll ..................... B32B 15/012 220/573.1 |
| 2017/0157895 A1 * | 6/2017 | Groll ..................... B32B 15/18 |
| 2017/0325627 A1 * | 11/2017 | Park ..................... A47J 36/025 |

FOREIGN PATENT DOCUMENTS

| | | |
|---|---|---|
| CN | 201227182 Y | 4/2009 |
| CN | 205697130 U | 11/2016 |
| EP | 0966910 A1 | 12/1999 |
| EP | 1479329 A1 | 11/2004 |
| GB | 556065 A | 9/1943 |
| GB | 1329979 | 9/1973 |
| GB | 2034173 A | 6/1980 |
| JP | H0884659 A | 4/1996 |
| JP | H0884671 A | 4/1996 |
| JP | 2002059505 | 2/2002 |
| JP | 2002065469 | 3/2002 |
| JP | 2004009097 | 1/2004 |
| JP | 2006341272 | 12/2006 |
| KR | 1020060027845 | 3/2006 |
| KR | 1020090010823 | 1/2009 |
| KR | 1020110044010 | 4/2011 |
| WO | 8704911 A1 | 8/1987 |
| WO | 2005018393 A1 | 3/2005 |

\* cited by examiner

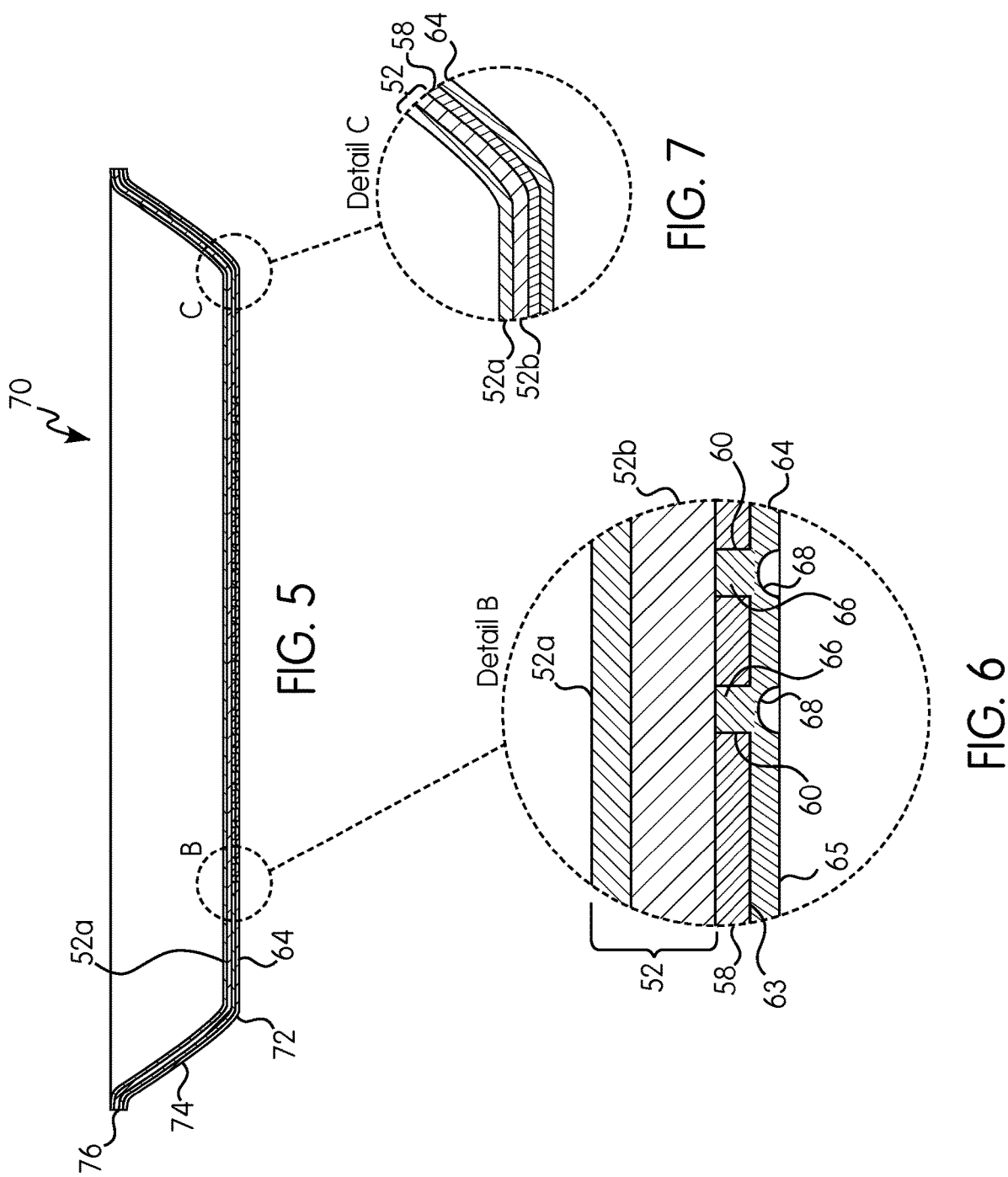

COOKWARE HAVING A GRAPHITE CORE

BACKGROUND OF THE INVENTION

Field of the Invention

The present invention relates generally to multi-ply, bonded cookware, and in particular to multi-ply, bonded cookware having a core layer of perforated graphite between at least two metal layers metallurgically bonded together. A method for making the cookware using a solid state bonding technique is also disclosed.

Description of Related Art

It has long been known to manufacture multi-layer bonded composite cookware in which various materials are joined together to combine the desired physical properties of each of the materials into a composite. For example, the corrosion resistance of stainless steel is ideal for the cooking surface as well as for the exterior surface of cookware; however, the thermal conductivity of stainless steel is relatively low. On the other hand, aluminum and/or copper offer much higher thermal conductivities and have been bonded to stainless steel to provide well-known composite cookware items such as pots, pans, and the like. Multi-layer bonded cookware is known in the art, as shown in a number of patents, such as, for example: U.S. Pat. Nos. 4,246,045 and 4,167,606 to Ulam; and U.S. Pat. Nos. 8,133,596 and 6,267,830 to Groll. These patents demonstrate the manufacture of multi-layer bonded cookware having stainless steel outer layers bonded to central layer(s) of a higher conductivity aluminum and/or copper. The bonding between layers of these different materials is commonly achieved by conventional roll-bonding techniques using strips of aluminum and/or copper, roll-bonded to outer strips of stainless steel.

A solid state bonding technique using high static pressure and heat applied over time to make a plurality of composite blanks of, for example, a combination of stainless steel—aluminum—stainless steel in manufactured cookware, is disclosed in U.S. Pat. No. 9,078,539 to Groll et al. There is a continued need in the art for producing cookware made using solid state bonding techniques for reducing the weight and improving thermal characteristics of the cookware.

SUMMARY OF THE INVENTION

In view of the existing need in the art, it would be desirable to develop new methods of producing cookware using solid state bonding techniques. It would be further desirable to provide cookware made by such methods, wherein the cookware has reduced weight and improved thermal characteristics over existing cookware made by solid state bonding techniques.

In accordance with some embodiments or aspects of the present disclosure, cookware may be made from a bonded multi-layer composite. The cookware may have at least one upper metal layer, a lower metal layer having a plurality of spaced-apart upwardly protruding dimples formed thereon, and a graphite core layer disposed between the at least one upper metal layer and the lower metal layer. The graphite core layer may have a plurality of spaced-apart holes extending therethrough. The plurality of dimples may extend through the plurality of holes, and the plurality of dimples may be metallurgically bonded to the at least one upper metal layer.

In accordance with some embodiments or aspects of the present disclosure, the at least one upper metal layer may have a layer of stainless steel or titanium bonded to a sub-layer of aluminum. The at least one upper metal layer may be made from an aluminum alloy of 1000 series, such as an 1100 alloy, or an Alclad material. The lower metal layer may be made from stainless steel or titanium and the plurality of dimples may be bonded to the aluminum alloy of the at least one upper layer. The stainless steel of the lower metal layer may be a ferro-magnetic grade of stainless steel or other corrosion-resistant grade of stainless steel. The graphite core layer may be made from pyrolytic graphite.

In accordance with some embodiments or aspects of the present disclosure, the lower metal layer may have a central portion and an outer portion surrounding the central portion, with the plurality of dimples being formed in the central portion. The central portion may be recessed relative to the outer portion to receive the graphite core layer. The outer portion may be directly bonded to the at least one upper metal layer to form a fully bonded sidewall of the cookware.

In accordance with some embodiments or aspects of the present disclosure, cookware made from a bonded multi-layer composite may have an upper layer of stainless steel or titanium pre-bonded to a sub-layer of aluminum. The cookware may further have a graphite core layer having a plurality of spaced-apart holes formed therethrough. The cookware may further have a lower layer of stainless steel or titanium having a central portion including a plurality of upwardly protruding, spaced-apart dimples extending through the plurality of holes in the graphite core disc, and an outer portion surrounding the central portion. The central portion may be recessed relative to the outer portion. The outer portion may be bonded to the sub-layer of aluminum, and the plurality of dimples may be bonded to the sub-layer of aluminum.

In accordance with some embodiments or aspects of the present disclosure, the sub-layer of aluminum is made from an aluminum alloy of 1000 series, such as an 1100 alloy, or an Alclad material. The lower layer may be made from a ferro-magnetic grade of stainless steel or other corrosion-resistant grade of stainless steel. The graphite core disc may be made from pyrolytic graphite.

In accordance with some embodiments or aspects of the present disclosure, a method of making cookware may include (a) providing an upper metal disc comprising aluminum; (b) providing a graphite core disc having a plurality of spaced-apart holes therethrough; (c) providing a lower metal disc of stainless steel or titanium having a plurality of upwardly protruding, spaced-apart dimples in a central portion of the lower metal disc with an outer portion surrounding the central portion, wherein the central portion is recessed relative to the outer portion; (d) stacking the discs provided in steps (a)-(c) in a blank assembly such that the graphite core disc is received within the central portion whereby the plurality of dimples in the lower metal disc are aligned with and pass through the plurality of holes in the graphite core disc, with the plurality of dimples having upper end portions extending above an upper surface of the graphite core disc such that a lower surface of the upper metal disc contacts an upper surface of the outer portion of the lower metal disc and the upper end portions of the plurality of dimples; and (e) pressing the blank assembly by applying a force in a direction perpendicular to a plane of the discs in the blank assembly and concurrently heating the blank assembly to achieve a metallurgical bond between metal materials of the discs in the blank assembly to provide a bonded blank assembly. The method may further include (f) cooling the bonded blank assembly; and (g) forming the bonded blank assembly into the cookware.

In accordance with some embodiments or aspects of the present disclosure, cookware having a multi-layer bonded composite wall structure may have an upper pre-bonded layer having a stainless steel or titanium layer defining an inside surface of the cookware and a first layer of aluminum bonded thereto. The cookware may further have a core layer with a central graphite disc having a plurality of spaced-apart holes formed in a patterned array. The core layer further may have a second ring-shaped outer core layer of aluminum surrounding the graphite disc. The core layer may face the first layer of aluminum. The cookware may further have a lower layer of stainless steel or titanium facing the core layer and defining an outside surface of the cookware. The lower layer of stainless steel or titanium may have a plurality of dimples formed therein in a patterned array to match the patterned array of holes formed in the graphite disc such that whereby the dimples of the lower layer of stainless steel or titanium may form a bond with the first layer of aluminum in a central area of the cookware occupied by the graphite disc. A peripheral area of the cookware defining the sidewall including the upper and lower layers of stainless steel or titanium may be continuously bonded together by way of the first and second layers of aluminum.

In accordance with some embodiments or aspects of the present disclosure, cookware made from a bonded multi-layer composite may have a core construction including a central core disc of graphite having a plurality of spaced-apart holes formed therethrough and a ring-shaped outer core layer of aluminum surrounding the central core disc of graphite. The cookware may further have an upper pre-bonded layer having an upper disc of stainless steel or titanium bonded to a lower disc of aluminum. The lower disc of aluminum may be bonded to the ring-shaped outer core layer of aluminum having a lower layer of stainless steel or titanium with a central portion having a plurality of upwardly protruding, spaced-apart dimples formed therein. The dimples may extend through the holes in the graphite central core disc and may be bonded to the lower disc of aluminum of the upper pre-bonded layer. The lower stainless steel or titanium layer further may have an outer portion surrounding the dimples and bonded to the ring-shaped outer core layer of aluminum.

These and other features and characteristics of the cookware described herein, as well as methods of making such cookware, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only. Hence, specific dimensions and other physical characteristics related to the embodiments disclosed herein are not to be considered as limiting. Further, it is to be understood that the disclosure may assume various alternative variations and step sequences, except where expressly specified to the contrary.

BRIEF DESCRIPTION OF THE DRAWING(S)

FIG. 5 is a cross-sectional view of a formed fry pan shape made from the bonded blank assembly of FIG. 1;

FIG. 6 is an enlarged view of Detail B shown in FIG. 5;

FIG. 7 is an enlarged view of Detail C shown in FIG. 5;

In FIGS. 1-12, the same characters represent the same components unless otherwise indicated.

DETAILED DESCRIPTION OF THE INVENTION

Figure 1:
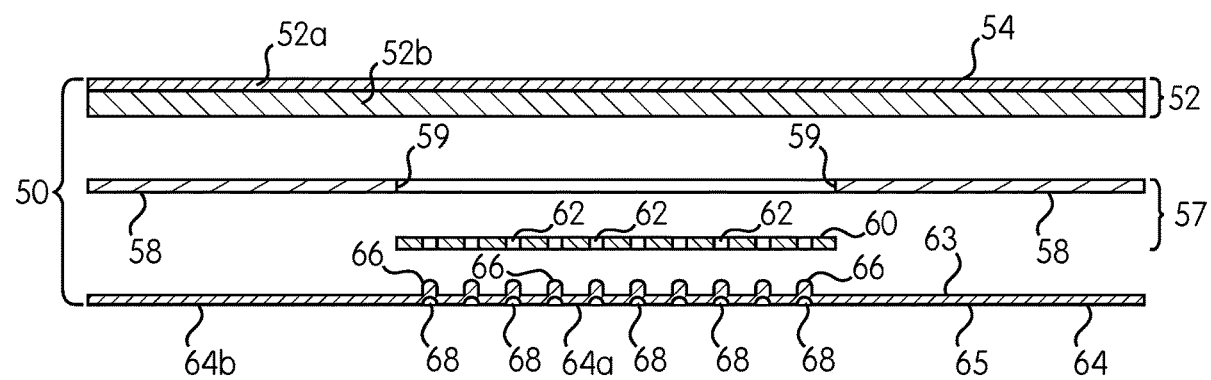
FIG. 1 is an exploded side cross-sectional view of a blank assembly in accordance with some embodiments or aspects of the present disclosure.
Figure 2:
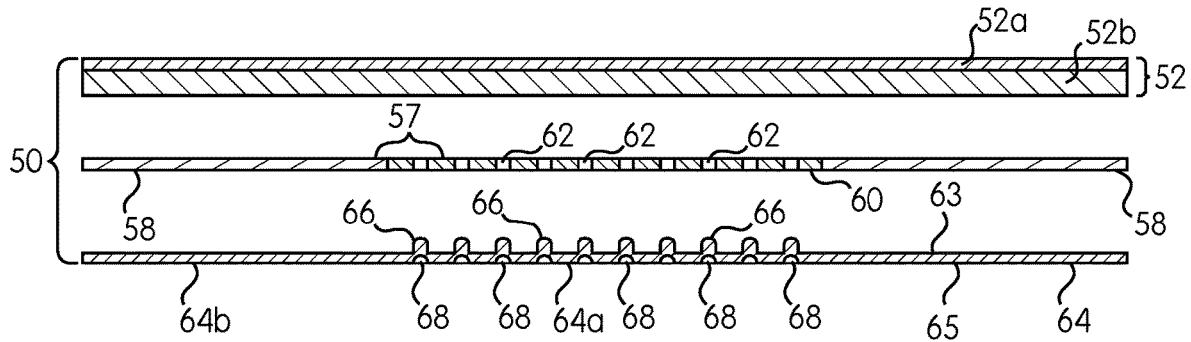
FIG. 2 is an exploded side cross-sectional view of the blank assembly of FIG. 1, with a core layer shown in an assembled state.
Figure 3:
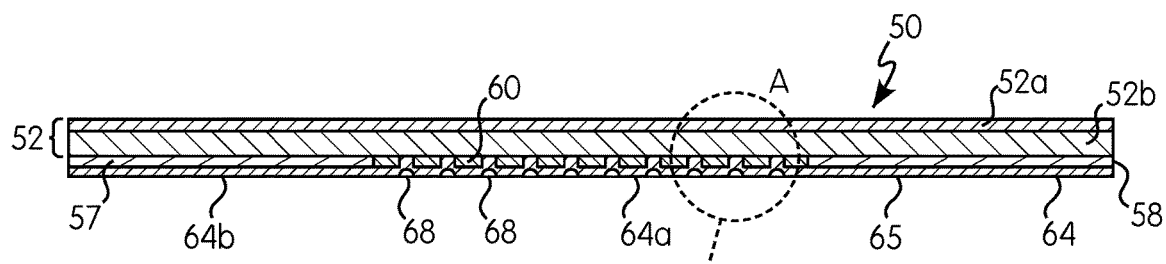
FIG. 3 is an assembled side cross-sectional view of a blank assembly of FIG. 1.
Figure 4:
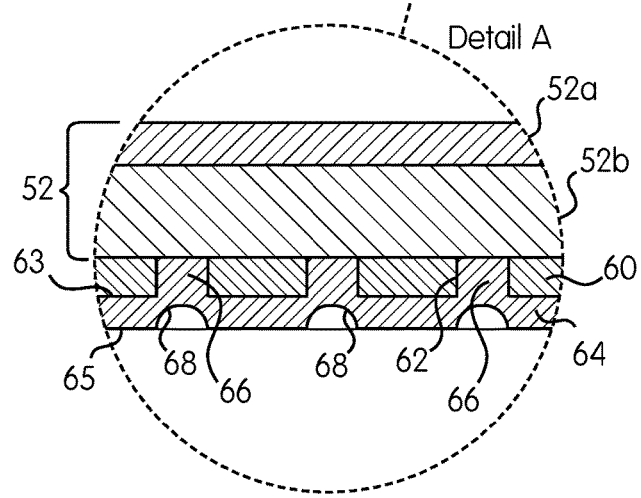
FIG. 4 is an enlarged view of Detail A shown in FIG. 3.

As used in the specification and the claims, the singular form of "a", "an", and "the" include plural referents unless the context clearly dictates otherwise.

For purposes of the description hereinafter, the terms "end", "upper", "lower", "right", "left", "vertical", "horizontal", "top", "bottom", "lateral", "longitudinal" and derivatives thereof shall relate to the disclosure as it is oriented in the drawing figures. However, it is to be understood that the disclosure may assume various alternative variations and step sequences, except where expressly specified to the contrary.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

All documents, such as but not limited to issued patents and patent applications, referred to herein, and unless otherwise indicated, are to be considered to be "incorporated by reference" in their entirety.

The terms "first", "second", and the like are not intended to refer to any particular order or chronology, but refer to different conditions, properties, or elements.

The term "at least" is synonymous with "greater than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C.

The term "adjacent" means "proximate to".

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "solid state bonding" means a method of bonding two or more stacked layers of metals or metal alloys together using high pressure (typically over 5,000 psi) and high temperature (typically over 600° F.), wherein the high pressure is applied in a normal or perpendicular direction, i.e., 90° relative to the plane of the stacked layers.

As used herein, the term "metallurgical bonding" or "metallurgically bonded" refers to a bond formed between similar or dissimilar materials that is free of voids or discontinuities.

With reference to the drawings, FIGS. 1-4 depict various views of a blank assembly 50 used in making some embodiments of cookware of the present invention. In some embodiments or aspects, each blank assembly 50 may be used to form a piece of cookware, such as a pot or a frying pan depicted in FIGS. 5-7. As discussed herein, the blank assembly 50 is formed from a plurality of stacked discs or layers that are metallurgically bonded together to form an integral blank assembly 50. In some embodiments or aspects, the plurality of stacked discs or layers may be stacked such that the individual discs are substantially parallel to each other. The stacked assembly may then be bonded together using a solid state bonding technique, wherein the stacked plates are bonded using high pressure (typically over 5,000 psi) and high temperature (typically over 600° F.). Desirably, the high pressure is applied in a normal or perpendicular direction, i.e., 90° relative to the plane of the stacked layers. The bonded layers constitute the blank assembly 50.

With continued reference to FIGS. 1-4, the blank assembly 50 has at least one upper metal disc or layer 52 (hereinafter referred to as "upper metal layer 52") and at least one lower metal disc or layer 64 (hereinafter referred to as "lower metal layer 64"). A core disc or layer 57 (hereinafter referred to as "core layer 57") is disposed between the upper metal layer 52 and the lower metal layer 64. An upper or top surface of the upper metal layer 52 forms an inner surface of the cookware while a lower or bottom surface of the lower metal layer 64 forms an outer surface of the cookware.

With continued reference to FIGS. 1-4, the upper metal layer 52 may be a composite having a first layer 52a stacked on top of a second or sub layer 52b. The first layer 52a defines the cooking surface of the cookware, while the second layer 52b is selected for bonding with at least a portion of the core layer 57 and the lower metal layer 64, as discussed herein. Accordingly, the first layer 52a is selected such that it has desirable scratch resistance, wear, and thermal properties required for a cooking surface of the cookware. The material of the second layer 52b is selected such that it has a bonding affinity to the metal materials of at least a portion of the core layer 57 and the lower metal layer 64, as discussed herein. In some embodiments or aspects, the first layer 52a may be formed from a food-grade stainless steel, while the second layer 52b may be formed from aluminum. The stainless steel of the first layer 52a may be, for example, a 400 series stainless steel, such as a 436 stainless steel. In some embodiments or aspects, the stainless steel of the first layer 52a may be any corrosion-resistant stainless steel alloy suitable for use as a food preparation surface. In further embodiments or aspects, the first layer 52a may be made from a titanium alloy suitable for use as a food preparation surface. The aluminum of the second layer 52b may be, for example, a 1000 series aluminum alloy, such as an 1100 aluminum alloy. In some embodiments or aspects, the aluminum of the second layer 52b may be a 7072 aluminum alloy or an Alclad material having high purity aluminum surface layer metallurgically bonded to a high-strength aluminum alloy core material.

In some embodiments or aspects, the first layer 52a and the second layer 52b may be pre-bonded to form the pre-bonded upper metal layer 52, such as using a solid state bonding technique, or a roll bonding technique. In other embodiments or aspects, the first layer 52a and the second layer 52b may be bonded together during a bonding process when the blank assembly 50 is formed. Forming the upper metal layer 52 as a pre-bonded structure having the first layer 52a and the second layer 52b provides an improved bonding strength between the stainless steel first layer 52a and the aluminum second layer 52b, particularly in the central area of the cookware above a graphite layer 60 than would otherwise occur if the upper metal layer 52 was not pre-bonded. The graphite layer 60 does not efficiently transmit the axial forces during the solid state bonding process to the aluminum-stainless steel interface. Hence, the pre-bonding of the upper metal layer 52 is beneficial.

The first and second layers 52a, 52b of the upper metal layer 52 may be discs about 14 inches in diameter to form a near-net size blank for making a fry pan of 10 inches in diameter. In other embodiments or aspects, the first and second layers 52a, 52b of the upper metal layer 52 may be discs from about 5 inches to about 20 inches in diameter to form cookware of various sizes. In some embodiments or aspects, a thickness of the first layer 52a may be about 0.010 inches (0.254 mm) to about 0.040 inches (1.02 mm), such as about 0.015 inches (0.381 mm). In some embodiments or aspects, a thickness of the second layer 52b may be about 0.010 inches (0.254 mm) to about 0.080 inches (2.04 mm), such as about 0.035 inches (0.889 mm). One of ordinary skill in the art would readily appreciate that the diameter and thickness of the first and second layers 52a, 52b of the upper metal layer 52 can be increased or decreased to make fry pans of larger or smaller diameter and thickness, respectively.

With continued reference to FIGS. 1-4, the lower metal layer 64 has a central portion 64a and an outer portion 64b surrounding the central portion 64a. In some embodiments or aspects, the outer portion 64b completely surrounds the central portion 64a. The central portion 64a may be substantially circular and be positioned in the middle of the outer portion 64b. The central portion 64a and the outer portion 64b may be coplanar. The lower metal layer 64a has a plurality of upwardly protruding, spaced-apart dimples 66

(hereinafter referred to as "dimples 66") extending upwardly from an upper surface 63 of the lower metal layer 64. In some embodiments or aspects, the dimples 66 may be provided in the central portion 64a of the lower metal layer 64, while the outer portion 64b is void of dimples 66. The dimples 66 may be arranged in an ordered array or distributed randomly over the central portion 64a. For examples, the dimples 66 may be arranged in a circular array with an equal or unequal spacing between adjacent dimples 66. In various embodiments or aspects, the density of the dimples 66 (i.e., number of dimples 66 per unit area) may be uniform across the central portion 64a, or it may vary between different portions of the central portion 64a. For example, the density of the dimples 66 may increase or decrease in a radial direction of the lower metal layer 64. In some embodiments or aspects, the dimples 66 may be provided in one or more groupings of dimples 66. The dimples 66 may have the same size (i.e., diameter) or a different size relative to each other.

With continued reference to FIGS. 1-4, the dimples 66 may be formed by stamping a plurality of punch indentations 68 on a lower or bottom surface 65 of the lower metal layer 64. The indentations 68 locally deform the shape of the lower metal layer 64 such that corresponding dimples 66 are formed on the upper surface 63. In this manner, the indentations 68 form a plurality of cavities on the lower surface 65 of the lower metal layer 64, while the corresponding dimples 66 form raised projections on the upper surface 63 of the lower metal layer 64. In some embodiments or aspects, the dimples 66 may have a height of about 0.010 inches (0.254 mm) to about 0.100 inches (2.54 mm), such as about 0.020 inches (0.508 mm) above the upper surface 63 of the lower metal layer 64. In some embodiments or aspects, the height of the dimples 66 is selected to be slightly higher than a thickness of the graphite core layer such that peaks of the dimples 66 protrude through the holes in the graphite core layer, as described herein. The dimples 66 may have a diameter of about 0.050 inches (1.27 mm) to about 0.250 inches (6.35 mm), such as about 0.125 inches (3.175 mm).

The lower metal layer 64 may be made from a material that has desirable scratch resistance, wear, and thermal properties required for an outside surface of the cookware. The material of the lower metal layer 64 is selected such that it has a bonding affinity to the metal materials of at least a portion of the core layer 57 and the upper metal layer 52, as discussed herein. In some embodiments or aspects, the lower metal layer 64 may be made of a ferro-magnetic stainless steel, such as a 400 grade in order to make the finished cookware suitable for use on an induction cooking apparatus. The stainless steel of the lower metal layer 64 may be, for example, a 436 stainless steel. In some embodiments or aspects, the stainless steel of the first layer 52a may be any stainless steel alloy suitable for use as a food preparation surface. In further embodiments or aspects, the lower metal layer 64 may be made from a titanium alloy suitable for use as a food preparation surface. The material of the lower metal layer 64 may be selected to have similar or identical material properties to that of the upper metal layer 52.

The lower metal layer 64 may be a disc about 14 inches in diameter to form a near-net size blank for making a fry pan of 10 inches in diameter. In other embodiments or aspects, the lower metal layer 64 may be a disc from about 5 inches to about 20 inches in diameter to form cookware of various sizes. In some embodiments or aspects, a thickness of the lower metal layer 64 may be about 0.010 inches (0.254 mm) to about 0.100 inches (2.54 mm), such as about 0.015 inches (0.381 mm). One of ordinary skill in the art would readily appreciate that the diameter and thickness of the lower metal layer 64 can be increased or decreased to make fry pans of larger or smaller diameter and thickness, respectively.

With continued reference to FIGS. 1-4, the core layer 57 is disposed between the upper metal layer 52 and the lower metal layer 64. The core layer 57 has a central graphite disc or layer 60 (hereinafter referred to as "graphite layer 60") having a plurality of spaced-apart holes 62 formed therethrough. The core layer 57 further has a ring-shaped outer core disc or layer 58 (hereinafter referred to as "outer core layer 58") surrounding the graphite layer 60. The outer core layer 58 has a central opening 59 shaped to receive the graphite layer 60 therein. In some embodiments or aspects, the central opening 59 may have a circular shape with a diameter that is the same or slightly larger than a diameter of a circularly-shaped graphite layer 60. For example, the central opening 59 may have a diameter of about 3 inches (76.2 mm) to about 12 inches (305 mm), such as about 7 inches (178 mm). The graphite layer 60 may have a corresponding diameter of about 90-99.9% of the diameter of the central opening 59. In other embodiments or aspects, the central opening 59 may have any desired geometric shape that corresponds to a geometric shape of the graphite layer 60.

The outer ring-shaped core disc 58 may be made from a material that has a bonding affinity to the metal materials of the upper metal layer 52 and the lower metal layer 64, as discussed herein. In some embodiments or aspects, the outer core disc 58 may be made of, for example, a 1000 series aluminum alloy, such as an 1100 aluminum alloy. In some embodiments or aspects, the aluminum of the second layer 52b may be a 7072 aluminum alloy or an Alclad material. The graphite layer 60 may be made of pyrolytic graphite so as to transmit thermal energy primarily in a radial (rather than axial) direction. In this manner, the cooking surface can be heated uniformly, while avoiding hot spots. Graphite is preferably selected due to its high coefficient of thermal conductivity (approximately 500-1500 W/mK versus approximately 220 W/mK for aluminum and 340 W/mK for copper). Pyrolytic graphite has approximately double the thermal conductivity compared to copper in a direction of the XY plane defining the cooking surface. The pyrolytic graphite is also approximately ⅙ the weight of copper and acts as an insulator in the Z direction compared to copper. The graphite layer 60 is effective in spreading heat evenly across the cooking surface while impeding heat flow in a direction perpendicular to the cooking surface. Without intending to be bound by theory, it has been found that the presence of the graphite layer 60 increases the resistance to current flow, thereby increasing the induction heating effectiveness compared to cookware without the graphite layer 60.

With continued reference to FIGS. 1-4, each of the spaced-apart holes 62 extends through the material of the central graphite disc 60 between its upper surface and its lower surface. The size and arrangement of the holes 62 in the graphite layer 60 is selected to correspond to the size and arrangement of the dimples 66 on the lower metal layer 64. In this manner, the dimples 66 can be arranged such that all of the dimples 66 are registered (i.e., in alignment) with all of the holes 62, with each dimple 66 being received within the respective hole 62. For example, in embodiments where the dimples 66 are arranged in a circular array with a uniform spacing of dimples 66 across the central portion 64a of the lower metal layer 64, the holes 62 have a corresponding circular array arrangement such that the dimples 66 can be received within the holes 62. In some examples, the number of holes 62 may be larger than the number of dimples 66, such that some holes 62 do not have dimples 66 therein. The empty holes 62 may leave an irregularity on the surface finish of the lower metal layer 64 during the solid state bonding process. In some embodiments or aspects, selective placement of the empty holes 62 may be used to define a pattern of irregularities in the surface finish of the lower metal layer 64 that defines an indicia, such as brand identification. The holes 62 may have a diameter of about 0.050 inches (1.27 mm) to about 0.250 inches (6.35 mm), such as about 0.125 inches (3.175 mm).

In some embodiments or aspects, the outer core layer 58 may be a disc about 14 inches in diameter to form a near-net size blank for making a fry pan of 10 inches in diameter. In other embodiments or aspects, the outer core layer 58 may be a disc from about 5 inches to about 20 inches in diameter to form cookware of various sizes. In some embodiments or aspects, a thickness of the outer core layer 58 may be about 0.010 inches (0.254 mm) to about 0.250 inches (6.35 mm), such as about 0.016 inches (0.406 mm). A thickness of the graphite layer 60 may be the same or slightly larger than a thickness of the outer core layer 58. Desirably, the thickness of the graphite layer 60 is the same as the thickness of the outer core layer 58. One of ordinary skill in the art would readily appreciate that the diameter and thickness of the outer core layer 58 and the graphite layer 60 can be increased or decreased to make fry pans of larger or smaller diameter and thickness, respectively. In some embodiments or aspects, the thickness of the graphite layer 60 is selected to be smaller than a height of the dimples 66 of the lower metal plate 64. In this manner, peaks of the dimples 66 may protrude above an upper surface of the graphite layer 60 when the dimples 66 are inserted into the corresponding holes 62 on the graphite layer 60.

Having described the structure of the blank assembly 50 in accordance with various embodiments or aspects of the present disclosure, a method of making cookware using the blank assembly 50 will now be described. Prior to bonding, the layers of the blank assembly 50 undergo appropriate surface preparation steps, such as degreasing, surface abrasion by chemical or mechanical methods, and the like. After appropriate surface preparation, an unbonded blank assembly 50 is formed by stacking the upper metal layer 52, the core layer 57, and the lower metal layer 64. In the case of the blank assembly 50 shown in FIGS. 1-4, the core layer 57 can be stacked on the upper surface 63 of the lower metal layer 64. The graphite layer 60 of the core layer 57 is arranged such that the holes 62 in the graphite plate 60 are aligned with the dimples 66 in the central portion 64a of the lower metal plate 64. Peaks of the dimples 66 are configured to extend above an upper surface of the graphite layer 60 when the dimples 66 are received within the holes 62 of the graphite layer 60. The outer core layer 58 of the core layer 57 is arranged such that it surrounds the graphite layer 60 and such that the lower surface of the outer core layer 58 faces the upper surface 63 of the lower metal layer 64.

The upper metal layer 52 is stacked on top of the core layer 57 such that a lower surface of the second layer 52b is positioned opposite an upper surface of the outer core layer 58 and the graphite layer 60. Desirably, the upper metal layer 52, the core layer 57, and the lower metal layer 64 are aligned such that centers of each layer share a common axis. In some embodiments or aspects, the layers may be stacked such that their centers are offset from one another. When stacked, the upper metal layer 52, the core layer 57, and the lower metal layer 64 are substantially parallel to each other. For efficiency of manufacture, a plurality of unbonded blank assemblies 50 may be stacked on top of each other, with or without spacer layers between adjacent blank assemblies 50.

The blank assembly 50, or a plurality of stacked blank assemblies 50, are then placed in a press apparatus (not shown) for application of a load or pressure in the normal or perpendicular direction relative to the planes of the layers in the blank assemblies 50 via a solid state bonding technique. The solid state bonding technique of bonding pre-cut near net shape plate blanks not only reduces scrap losses heretofore encountered in the conventional roll bonding manufacture of composite cookware but also permits the use of other materials in making multiple composites which have proven difficult, impossible and/or expensive to roll-bond. For example, solid state bonding permits the use of different grades of stainless steel than otherwise possible in conventional roll bonding so as to lower costs of materials. Furthermore, solid state bonding further allows encapsulating of materials, such as graphite, that cannot otherwise be bonded to stainless steel.

While under a pressure of between 5,000 and 20,000 psi, heat is applied to the blank assembly or assemblies 50 between about 500° F. and 1,000° F. for a sufficient time (about 1-4 hours) to achieve solid state bonding (i.e., metallurgical bonding) between the metal layers in the blank assembly or assemblies 50. During the solid state bonding process, the lower surface of the outer core layer 58 is metallurgically bonded with (1) the upper surface 63 of the outer portion 64b of the lower metal layer 64 and (2) the lower surface of the second layer 52b of the upper metal layer 52. Furthermore, because the peaks of the dimples 66 extend above the upper surface of the core layer 57, the dimples 66 are metallurgically bonded with the lower surface of the second layer 52b of the upper metal layer 52. The graphite layer 60 is thus completely encapsulated between the upper and lower metal layers 52, 64 on its upper and lower sides, with the outer core layer 58 completely surrounding the graphite layer 60 on its lateral sides.

Each blank assembly 50 is then removed from the press apparatus and allowed to cool. In some embodiments or aspects, cooling may be accomplished by exposure to ambient air or by using a cooling agent, such as forced air or liquid.

After solid state bonding, the bonded blank assembly 50 is formed in a drawing press or hydroform machine (not shown) into a desired shape of cookware 70, such as a fry pan shape depicted in FIGS. 5-7. The cookware 70 has a substantially planar cooking surface 71 and a raised sidewall 74 surrounding the cooking surface 71 and protruding vertically above the cooking surface 71. The sidewall 74 a radiused portion 72 connected to the cooking surface 71 and a rim 76 at a free end thereof. A handle or handles (not shown) may be attached to the cookware in a known manner. The cookware 70 formed using the blank assembly 50 described herein has reduced weight compared to conventional cookware due to the use of lightweight graphite and aluminum materials. Furthermore, the cookware 70 has increased performance compared to conventional cookware due to even heat distribution across the cooking surface facilitated by the graphite layer.

Figure 8:
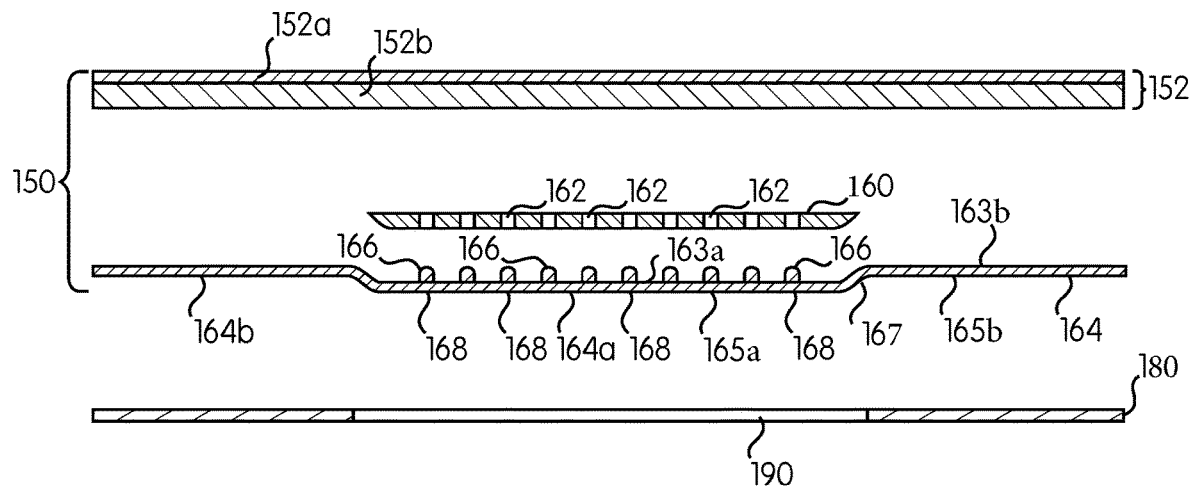
FIG. 8 is an exploded side cross-sectional view of a blank assembly in accordance with other embodiments or aspects of the present disclosure.
Figure 9:
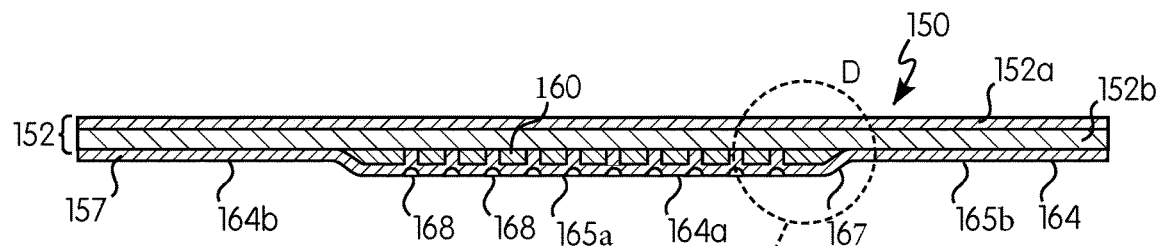
FIG. 9 is an assembled side cross-sectional view of a blank assembly of FIG. 8 shown without a spacer.
Figure 10:
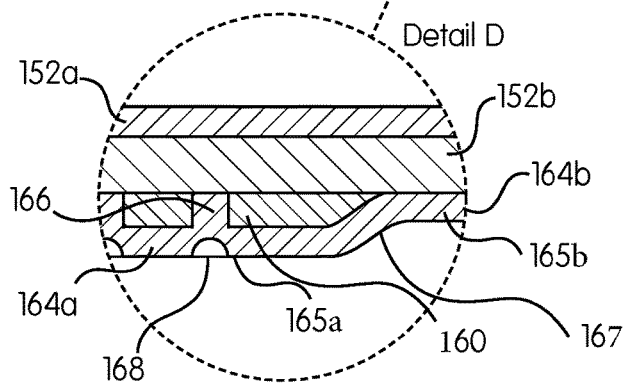
FIG. 10 is an enlarged view of Detail D shown in FIG. 9.
Figure 11:
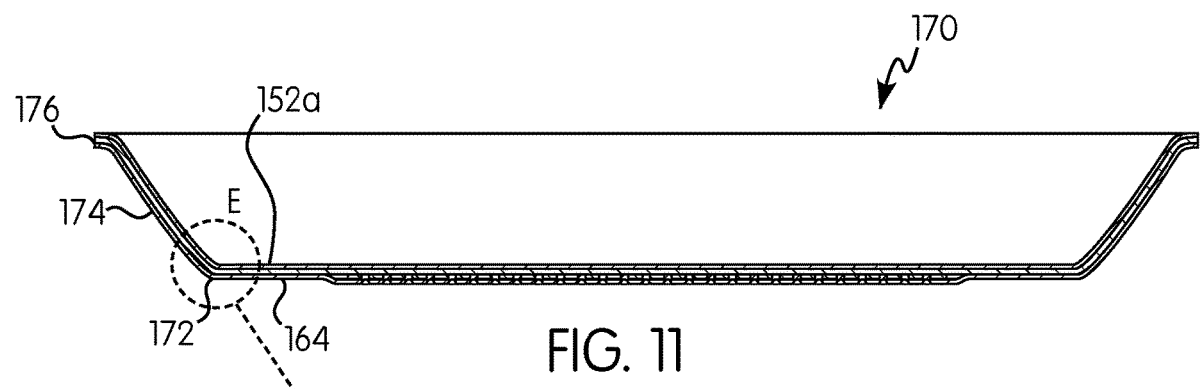
FIG. 11 is a cross-sectional view of a formed fry pan shape made from the bonded blank assembly of FIG. 9.
Figure 12:
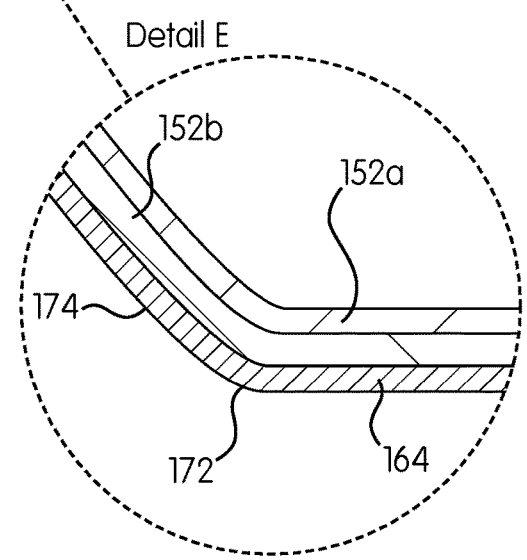
FIG. 12 is an enlarged view of Detail E shown in FIG. 11.

With reference to FIGS. 8-10, a blank assembly 150 is shown in accordance with further embodiments or aspects of the present disclosure. Similar to the blank assembly 50 shown in FIGS. 1-4, the blank assembly 150 may be used to form a piece of cookware, such as a pot or a frying pan depicted in FIGS. 11-12. As discussed herein, the blank assembly 150 is formed from a plurality of stacked discs or layers that are metallurgically bonded together to form an integral blank assembly 150.

With continued reference to FIGS. 8-10, the blank assembly 150 has at least one upper metal disc or layer 152 (hereinafter referred to as "upper metal layer 152") and at least one lower metal disc or layer 164 (hereinafter referred to as "lower metal layer 164"). A core disc or layer 160 made from graphite (hereinafter referred to as "graphite core layer 160") is disposed between the upper metal layer 152 and the lower metal layer 164. An upper or top surface of the upper metal layer 152 forms an inner surface of the cookware while a lower or bottom surface of the lower metal layer 164 forms an outer surface of the cookware.

With continued reference to FIGS. 8-10, the upper metal layer 152 may be a composite having a first layer 152a stacked on top of a second or sub layer 152b. The first layer 152a defines the cooking surface of the cookware, while the second layer 152b is selected for bonding with at least a portion of the lower metal layer 164, as discussed herein. Accordingly, the first layer 152a is selected such that it has desirable scratch resistance, wear, and thermal properties required for a cooking surface of the cookware. The material of the second layer 152b is selected such that it has a bonding affinity to the metal material of the lower metal layer 164, as discussed herein. In some embodiments or aspects, the size, shape, material properties, and method of forming the upper metal layer 152 may be the same or similar to the size, shape, material properties, and method of forming the upper metal layer 52 described herein with reference to FIGS. 1-4.

With continued reference to FIGS. 8-10, the lower metal layer 164 has a central portion 164a and an outer portion 164b surrounding the central portion 164a. In some embodiments or aspects, the central portion 164a is recessed relative to the outer portion 164b such that an upper surface 163a of the central portion 164a is offset from an upper surface 163b of the outer portion 164b. In some embodiments or aspects, the upper surface 163a of the central portion 164a may be offset from the upper surface 163b of the outer portion 164b by 0.010 inches (0.254 mm) to 0.250 inches (6.35 mm). A transition between the central portion 164a and the outer portion 164b may be defined by a rim 167. The central portion 164a may be substantially circular and be positioned in the middle of the outer portion 164b.

The central portion 164a has a plurality of upwardly protruding, spaced-apart dimples 166 (hereinafter referred to as "dimples 166") extending upwardly from the upper surface 163a. In some embodiments or aspects, the dimples 166 may be provided in the central portion 164a of the lower metal layer 164, while the outer portion 164b is void of dimples 166. The size, shape, arrangement, and method of forming the dimples 166 may be similar or identical to the size, shape, arrangement, and method of forming the dimples 166 discussed herein with reference to FIGS. 1-4.

The lower metal layer 164 may be made from a material that has desirable scratch resistance, wear, and thermal properties required for an outside surface of the cookware. The material of the lower metal layer 164 is selected such that it has a bonding affinity to the metal materials of the upper metal layer 152, as discussed herein. In some embodiments or aspects, the lower metal layer 164 may be made of a ferro-magnetic stainless steel, such as a 400 grade in order to make the finished cookware suitable for use on an induction cooking apparatus. The stainless steel of the lower metal layer 164 may be, for example, a 436 stainless steel. The lower metal layer 164 may be a disc about 14 inches in diameter to form a near-net size blank for making a fry pan of 10 inches in diameter. In other embodiments or aspects, the lower metal layer 164 may have the same range of diameters and thicknesses as the lower metal layer 64 described herein with reference to FIGS. 1-4.

With continued reference to FIGS. 8-10, the graphite core layer 160 is disposed between the upper metal layer 152 and the lower metal layer 164. In some embodiments or aspects, the graphite core layer 160 is sized such that it is received within the cavity formed by the central portion 164a of the lower metal layer 164. The graphite core layer 160 has a plurality of spaced-apart holes 162 formed therethrough such that the holes 162 extend through the material of the graphite layer 160 between its upper surface and its lower surface. The graphite layer 160 may be similar or identical in size, shape, material, and thermal properties as the graphite layer 60 described herein with reference to FIGS. 1-4.

The size, shape, arrangement, and method of forming the holes 162 may be similar or identical to the size, shape, arrangement, and method of forming the holes 62 described herein with reference to FIGS. 1-4. Each of the spaced-apart holes 162 in the graphite layer 160 is selected to correspond to the size and arrangement of the dimples 166 on the central portion 164a of the lower metal layer 164. In this manner, the dimples 166 can be arranged such that the dimples 166 are registered (i.e., in alignment) with the holes 162, with the dimples 166 being received within the holes 162. In some embodiments or aspects, the thickness of the graphite core layer 160 is selected to be smaller than a height of the dimples 166 of the lower metal plate 164. In this manner, peaks of the dimples 166 may protrude above an upper surface of the graphite core layer 160 when the dimples 166 are inserted into the corresponding holes 162 on the graphite core layer 160.

Having described the structure of the blank assembly 150 in accordance with various embodiments or aspects of the present disclosure, a method of making cookware using the blank assembly 150 will now be described. Prior to bonding, the layers of the blank assembly 150 undergo appropriate surface preparation steps, such as degreasing, surface abrasion by chemical or mechanical methods, and the like. After appropriate surface preparation, an unbonded blank assembly 150 is formed by stacking the upper metal layer 152, the graphite core layer 160, and the lower metal layer 164. In the case of the blank assembly 150 shown in FIGS. 8-10, the graphite core layer 160 is positioned in the recess formed by the central portion 164a of the lower metal layer 164. The graphite core layer 160 is arranged such that the holes 162 in the graphite core layer 160 are aligned with the dimples 166 in the central portion 164a of the lower metal plate 164. Peaks of the dimples 166 are configured to extend above an upper surface of the graphite core layer 160 when the dimples 166 are received within the holes 162 of the graphite core layer 160. The upper surface of the graphite core layer 160 may be coplanar with the upper surface 163b of the outer portion 164b of the lower metal core 164 when the graphite core layer 160 is positioned in the recess defined by the central portion 164a of the lower metal layer 164.

The upper metal layer 152 is stacked on top of the lower metal layer 164 and the graphite core layer 160 such that a lower surface of the second layer 152b is positioned opposite the upper surface 167 of the outer portion 164b of the lower metal layer 164 and opposite the upper surface of the graphite core layer 160. Desirably, the upper metal layer 152, the graphite core layer 160, and the lower metal layer 164 are aligned such that centers of each layer share a common axis. In some embodiments or aspects, the layers may be stacked such that their centers are offset from one another. When stacked, the upper metal layer 152, the graphite core layer 160, and the lower metal layer 164 are substantially parallel to each other.

In order to compensate for the offset between the central portion 164a and the outer portion 164b of the lower metal layer 164, an outer spacer disc or layer 180 (shown in FIG. 8) is added during bonding of the blank assembly 150. The outer spacer layer 180 has a central opening 190 shaped to receive the central portion 164a of the lower metal layer 164 therein. In some embodiments or aspects, the central opening 190 may have a circular shape with a diameter that is the same or slightly larger than a diameter of a circularly-shaped central portion 164a of the lower metal layer 164. In other embodiments or aspects, the central opening 190 may have any desired geometric shape that corresponds to a geometric shape of the central portion 164a of the lower metal layer 164. A thickness of the outer spacer layer 180 is selected to correspond to an offset between a lower or bottom surface 165a of the central portion 164a and a lower or bottom surface 165b of the outer portion 164b. In this manner, a thickness of the unbonded blank assembly 150 is the same in a radial or lateral direction to assure a uniform bonding pressure during the solid state bonding process.

For efficiency of manufacture, a plurality of unbonded blank assemblies 150, each having a respective outer spacer layer 180, may be stacked on top of each other, with or without separators between adjacent blank assemblies 150.

The blank assembly 150 and the outer spacer layer 180, or a plurality of stacked blank assemblies 150 and outer spacer layers 180, are then placed in a press apparatus (not shown) for application of a load or pressure in the normal or perpendicular direction relative to the planes of the layers in the blank assemblies 150 via a solid state bonding technique. While under a pressure of between 5,000 and 20,000 psi, heat is applied to the blank assembly or assemblies 150 between about 500° F. and 1,000° F. for a sufficient time (about 1-4 hours) to achieve solid state bonding (i.e., metallurgical bonding) between the metal layers in the blank assembly or assemblies 150. During the solid state bonding process, the upper surface 163b of the outer portion 164b of the lower metal layer 164 is metallurgically bonded with the lower surface of the second layer 152b of the upper metal layer 152. Furthermore, because the peaks of the dimples 166 extend above the upper surface of the graphite core layer 160, the dimples 166 are metallurgically bonded with the lower surface of the second layer 152b of the upper metal layer 152. The graphite core layer 160 is thus encapsulated between the upper and lower metal layers 152, 164 on its upper and lower sides. The graphite core layer 160 is surrounded by the rim 167 of the lower metal layer 164 along its outer circumference such that the graphite core layer 160 is completely encapsulated between the upper and lower metal layers 152, 164.

Each blank assembly 150 and the outer spacer layer 180 are then removed from the press apparatus and allowed to cool. In some embodiments or aspects, cooling may be accomplished by exposure to ambient air or by using a cooling agent, such as forced air or liquid.

After solid state bonding and cooling, the outer spacer layer 180 is removed from the bonded blank assembly 150. The bonded blank assembly 150 is formed in a drawing press or hydroform machine (not shown) into a desired shape of cookware 170, such as a fry pan shape depicted in FIGS. 11-12. The cookware 170 has a substantially planar cooking surface 171 and a raised sidewall 174 surrounding the cooking surface 171 and protruding vertically above the cooking surface 171. The sidewall 174 a radiused portion 172 connected to the cooking surface 171 and a rim 176 at a free end thereof. A handle or handles (not shown) may be attached to the cookware in a known manner. The cookware 170 formed using the blank assembly 150 described herein has reduced weight compared to conventional cookware due to the use of lightweight graphite and aluminum materials. Furthermore, the cookware 170 has increased performance compared to conventional cookware due to even heat distribution across the cooking surface facilitated by the graphite core layer 160.

In various examples, the present invention may be further characterized by one or more of the following clauses:

Clause 1. Cookware made from a bonded multi-layer composite, the cookware comprising: at least one upper metal layer; a lower metal layer having a plurality of upwardly protruding, spaced-apart dimples formed thereon; and a graphite core layer disposed between the at least one upper metal layer and the lower metal layer, the graphite core layer comprising a plurality of spaced-apart holes extending therethrough, wherein the plurality of dimples extend through the plurality of holes, and wherein the plurality of dimples are metallurgically bonded to the at least one upper metal layer.

Clause 2. The cookware of clause 1, wherein the at least one upper metal layer comprises a layer of stainless steel or titanium bonded to a sub-layer of aluminum.

Clause 3. The cookware of clause 1 or 2, wherein the at least one upper metal layer is made from an aluminum alloy of 1000 series or an Alclad material.

Clause 4. The cookware of clause 3, wherein the aluminum alloy is an 1100 alloy.

Clause 5. The cookware of clause 3 or 4, wherein the lower metal layer is made from stainless steel or titanium and wherein the plurality of dimples are bonded to the aluminum alloy of the at least one upper layer.

Clause 6. The cookware of clause 5, wherein the stainless steel is a ferro-magnetic grade of stainless steel or other corrosion-resistant grade of stainless steel.

Clause 7. The cookware of any of clauses 1-6, wherein the graphite layer is made from pyrolytic graphite.

Clause 8. The cookware of any of clauses 1-7, wherein lower metal layer has a central portion and an outer portion surrounding the central portion, wherein the plurality of dimples are formed in the central portion, and wherein the central portion is recessed relative to the outer portion to receive the graphite core layer.

Clause 9. The cookware of clause 8, wherein the outer portion is directly bonded to the at least one upper metal layer to form a fully bonded sidewall of the cookware.

Clause 10. Cookware made from a bonded multi-layer composite, the cookware comprising: an upper layer of stainless steel or titanium pre-bonded to a sub-layer of aluminum; a graphite core layer comprising a plurality of spaced-apart holes formed therethrough; and a lower layer of stainless steel or titanium having a central portion including a plurality of upwardly protruding, spaced-apart dimples extending through the plurality of holes in the graphite core disc, and an outer portion surrounding the central portion, wherein the central portion is recessed relative to the outer portion, wherein the outer portion is bonded to the sub-layer of aluminum, and wherein the dimples are bonded to the sub-layer of aluminum.

Clause 11. The cookware of claim 10, wherein the sub-layer of aluminum is made from an aluminum alloy of 1000 series or an Alclad material.

Clause 12. The cookware of clause 11, wherein the aluminum alloy is an 1100 alloy.

Clause 13. The cookware of any of clauses 10-12, wherein the lower layer is made from a ferro-magnetic grade of stainless steel or other corrosion-resistant grade of stainless steel.

Clause 14. The cookware of any of clauses 10-13, wherein the central graphite disc is made from pyrolytic graphite.

Clause 15. A method of making cookware, the method comprising: (a) providing an upper metal disc comprising aluminum; (b) providing a graphite core disc having a plurality of spaced-apart holes therethrough; (c) providing a lower metal disc of stainless steel or titanium having a plurality of upwardly protruding, spaced-apart dimples in a central portion of the lower metal disc and having an outer portion surrounding the central portion, wherein the central portion is recessed relative to the outer portion; (d) stacking the discs provided in steps (a)-(c) in a blank assembly such that the graphite core plate is received within the recessed central portion whereby the plurality of dimples in the lower metal disc are aligned with and pass through the plurality of holes in the graphite core disc, with the plurality of dimples having upper end portions extending above an upper surface of the graphite core disc such that a lower surface of the upper metal disc contacts an upper surface of the outer portion of the lower metal disc and the upper end portions of the plurality of dimples; and (e) pressing the blank assembly by applying a force in a direction perpendicular to a plane of the discs in the blank assembly and concurrently heating the blank assembly to achieve a metallurgical bond between metal materials of the discs in the blank assembly to provide a bonded blank assembly.

Clause 16. The method of clause 15, further comprising: (f) cooling the bonded blank assembly; and (g) forming the bonded blank assembly into the cookware.

Clause 17. The method of clause 15 or 16, further comprising adding an outer spacer disc around the central portion of the lower metal disc prior to pressing the blank assembly.

Clause 18. The method of any of clauses 15-17, wherein the upper metal disc comprises a layer made from an aluminum alloy of 1000 series or an Alclad material.

Clause 19. The method of any of clauses 15-18, wherein the lower metal disc is made from a ferro-magnetic grade of stainless steel or other corrosion-resistant grade of stainless steel.

Clause 20. The method of any of clauses 15-19, wherein the central core disc is made from pyrolytic graphite.

Clause 21. The method of any of clauses 15-20, wherein the upper metal disc is a pre-bonded composite comprising an upper layer of stainless steel or titanium bonded to a sub-layer of aluminum.

Clause 22. A method of making cookware, the method comprising: (a) providing a pre-bonded upper metal disc comprising an upper layer of stainless steel or titanium bonded to a sub-layer of aluminum; (b) providing a central core disc made from graphite and having a plurality of spaced-apart holes therethrough; (c) providing an outer core disc in the form of a ring-shaped disc of aluminum and placing the outer core disc around the central core disc; (d) providing a lower metal disc of stainless steel or titanium having a plurality of upwardly protruding, spaced-apart dimples in a central portion of the lower metal disc; (e) stacking the discs provided in steps (a)-(d) in a blank assembly such that the plurality of dimples in the lower metal disc are aligned with and pass through the plurality of holes in the central core disc, with the plurality of dimples having upper end portions extending above an upper surface of the core disc such that a lower surface of the upper metal disc contacts an upper surface of the outer core disc and the upper end portions of the plurality of dimples, and such that an outer portion of the lower metal disc surrounding the central portion contacts a lower surface of the outer core disc; and (f) pressing the blank assembly by applying a force in a direction perpendicular to a plane of the discs in the blank assembly and concurrently heating the blank assembly to achieve a metallurgical bond between metal materials of the discs in the blank assembly to provide a bonded blank assembly.

Clause 23. Cookware having a multi-layer bonded composite wall structure, the cookware comprising: an upper pre-bonded layer comprising a stainless steel or titanium layer defining an inside surface of the cookware and a first layer of aluminum bonded thereto, a core layer comprising a central graphite disc having a plurality of spaced-apart holes formed in a patterned array, the core layer further comprising a second ring-shaped outer core layer of aluminum surrounding the graphite disc, wherein the core layer faces the first layer of aluminum; and a lower layer of stainless steel or titanium facing the core layer and defining an outside surface of the cookware, the lower layer of stainless steel or titanium having a plurality of dimples formed therein in a patterned array to match the patterned array of holes formed in the graphite disc such that whereby the dimples of the lower layer of stainless steel form a bond with the first layer of aluminum in a central area of the cookware occupied by the graphite disc and wherein a peripheral area of the cookware defining the sidewall including the upper and lower layers of stainless steel or titanium are continuously bonded together by way of the first and second layers of aluminum.

Clause 24. Cookware made from a bonded multi-layer composite comprising: a core construction including a central core disc of graphite having a plurality of spaced-apart holes formed therethrough and a ring-shaped outer core layer of aluminum surrounding the central core disc of graphite; an upper pre-bonded layer comprising an upper disc of stainless steel or titanium bonded to a lower disc of aluminum, and wherein the lower disc of aluminum is bonded to the ring-shaped outer core layer of aluminum comprising a lower layer stainless steel or titanium having a central portion having a plurality of upwardly protruding, spaced-apart dimples formed therein, the dimples extending through the holes in the graphite central core disc and bonded to the lower disc of aluminum of the upper pre-bonded layer, the lower stainless steel layer further including an outer portion surrounding the dimples and bonded to the ring-shaped outer core layer of aluminum.

The present invention has been described with reference to specific details of particular examples thereof. It is not intended that such details be regarded as limitations upon the scope of the invention except insofar as and to the extent that they are included in the accompanying claims.

The invention claimed is:

1. Cookware made from a bonded multi-layer composite, the cookware comprising:
   at least one upper metal layer;
   a lower metal layer having a plurality of upwardly protruding, spaced-apart dimples formed on an upper surface of the lower metal layer via a plurality of indentations extending from a lower surface of the lower metal layer; and
   a graphite core layer disposed between the at least one upper metal layer and the lower metal layer, the graphite core layer comprising a plurality of spaced-apart holes extending therethrough,
wherein the plurality of dimples extend through the plurality of holes, and
wherein the plurality of dimples are metallurgically bonded to the at least one upper metal layer.

2. The cookware of claim 1, wherein the at least one upper metal layer comprises a layer of stainless steel or titanium bonded to a sub-layer of aluminum.

3. The cookware of claim 1, wherein the at least one upper metal layer is made from an aluminum alloy of 1000 series or an Alclad material.

4. The cookware of claim 3, wherein the aluminum alloy is an 1100 alloy.

5. The cookware of claim 3, wherein the lower metal layer is made from stainless steel or titanium and wherein the plurality of dimples are bonded to the aluminum alloy of the at least one upper layer.

6. The cookware of claim 5, wherein the stainless steel is a ferro-magnetic grade of stainless steel or other corrosion-resistant grade of stainless steel.

7. The cookware of claim 1, wherein the graphite layer is made from pyrolytic graphite.

8. The cookware of claim 1, wherein lower metal layer has a central portion and an outer portion surrounding the central portion, wherein the plurality of dimples are formed in the central portion, and wherein the central portion is recessed relative to the outer portion to receive the graphite core layer.

9. The cookware of claim 8, wherein the outer portion is directly bonded to the at least one upper metal layer to form a fully bonded sidewall of the cookware.

10. Cookware made from a bonded multi-layer composite, the cookware comprising:
an upper layer of stainless steel or titanium pre-bonded to a sub-layer of aluminum;
a graphite core layer comprising a plurality of spaced-apart holes formed therethrough; and
a lower layer of stainless steel or titanium having a central portion including a plurality of upwardly protruding, spaced-apart dimples extending through the plurality of holes in the graphite core layer, and an outer portion surrounding the central portion,
wherein the plurality of dimples are formed on an upper surface of the central portion via a plurality of indentations extending from a lower surface of the central portion;
wherein the central portion is recessed relative to the outer portion;
wherein the outer portion is bonded to the sub-layer of aluminum, and
wherein the dimples are bonded to the sub-layer of aluminum.

11. The cookware of claim 10, wherein the sub-layer of aluminum is made from an aluminum alloy of 1000 series or an Alclad material.

12. The cookware of claim 11, wherein the aluminum alloy is an 1100 alloy.

13. The cookware of claim 11, wherein the lower layer is made from a ferro-magnetic grade of stainless steel or other corrosion-resistant grade of stainless steel.

14. The cookware of claim 11, wherein the graphite core layer is made from pyrolytic graphite.

15. A method of making cookware, the method comprising:
(a) providing an upper metal disc comprising aluminum;
(b) providing a graphite core disc having a plurality of spaced-apart holes therethrough;
(c) providing a lower metal disc of stainless steel or titanium having a plurality of upwardly protruding, spaced-apart dimples in a central portion of the lower metal disc, wherein the central portion is recessed relative to an outer portion of the lower metal disc and wherein the plurality of dimples are formed on an upper surface of the central portion via a plurality of indentations extending from a lower surface of the central portion;
(d) stacking the discs provided in steps (a)-(c) in a blank assembly such that the graphite core disc is received within the recessed central portion whereby the plurality of dimples in the lower metal disc are aligned with and pass through the plurality of holes in the graphite core disc, with the plurality of dimples having upper end portions extending above an upper surface of the graphite core disc such that a lower surface of the upper metal disc contacts an upper surface of the outer portion of the lower metal disc and the upper end portions of the plurality of dimples; and
(e) pressing the blank assembly by applying a force in a direction perpendicular to a plane of the discs in the blank assembly and concurrently heating the blank assembly to achieve a metallurgical bond between metal materials of the discs in the blank assembly to provide a bonded blank assembly.

16. The method of claim 15, further comprising:
(f) cooling the bonded blank assembly; and
(g) forming the bonded blank assembly into the cookware.

17. The method of claim 15, further comprising adding an outer spacer disc around the central portion of the lower metal disc prior to pressing the blank assembly.

18. The method of claim 15, wherein the upper metal disc comprises a layer made from an aluminum alloy of 1000 series or an Alclad material.

19. The method of claim 15, wherein the lower metal disc is made from a ferro-magnetic grade of stainless steel or other corrosion-resistant grade of stainless steel.

20. The method of claim 15, wherein the central core disc is made from pyrolytic graphite.

21. The method of claim 15, wherein the upper metal disc is a pre-bonded composite comprising an upper layer of stainless steel or titanium bonded to a sub-layer of aluminum.

22. A method of making cookware, the method comprising:
(a) providing a pre-bonded upper metal disc comprising an upper layer of stainless steel or titanium bonded to a sub-layer of aluminum;
(b) providing a central core disc made from graphite and having a plurality of spaced-apart holes therethrough;
(c) providing an outer core disc in the form of a ring-shaped disc of aluminum and placing the outer core disc around the central core disc;
(d) providing a lower metal disc of stainless steel or titanium having a plurality of upwardly protruding, spaced-apart dimples in a central portion of the lower metal disc, the plurality of dimples being formed on an upper surface of the central portion via a plurality of indentations extending from a lower surface of the central portion;
(e) stacking the discs provided in steps (a)-(d) in a blank assembly such that the plurality of dimples in the lower metal disc are aligned with and pass through the plurality of holes in the central core disc, with the plurality of dimples having upper end portions extending above an upper surface of the core disc such that a lower surface of the upper metal disc contacts an upper surface of the outer core disc and the upper end portions of the plurality of dimples, and such that an outer portion of the lower metal disc surrounding the central portion contacts a lower surface of the outer core disc; and (f) pressing the blank assembly by applying a force in a direction perpendicular to a plane of the discs in the blank assembly and concurrently heating the blank assembly to achieve a metallurgical bond between metal materials of the discs in the blank assembly to provide a bonded blank assembly.

* * * * *